(12) United States Patent
Goswami et al.

(10) Patent No.: US 6,312,774 B1
(45) Date of Patent: *Nov. 6, 2001

(54) WOOD PRESERVATION UTILIZING POLYMERIC PHENOL SULFIDE

(75) Inventors: Jagadish C. Goswami, New City; Jian-Lin Liu, Yorktown Heights; Andress K. Doyle, Pleasantville, all of NY (US)

(73) Assignee: Akzo Nobel NV, Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/318,677

(22) Filed: May 25, 1999

Related U.S. Application Data

(63) Continuation of application No. 08/763,655, filed on Dec. 11, 1996, now Pat. No. 5,925,424.

(51) Int. Cl.[7] ............................. B32B 21/00; A01N 3/00; A01N 31/08; A01N 31/16

(52) U.S. Cl. ............................. 428/17; 428/15; 428/22; 428/537.1; 106/15.05; 106/287.26; 106/287.32; 252/380; 252/406; 528/373

(58) Field of Search .................................. 428/17, 15, 22, 428/537.1; 106/15.05, 287.26, 287.32; 252/380, 406; 508/373; 524/738, 739; 528/373

(56) References Cited

U.S. PATENT DOCUMENTS

| | | | |
|---|---|---|---|
| 3,812,192 | 5/1974 | Gabler et al. | 260/608 |
| 3,885,036 | 5/1975 | Moyle | 424/275 |
| 3,968,062 | 7/1976 | Ecsedy | 260/5 |
| 5,925,424 | 7/1999 | Goswami et al. | 428/17 |

OTHER PUBLICATIONS

Derwent Patent Abstract 91–248660/34 (1991).

K. Kawada, et al., "Studies on Oligomeric Antimicrobial Agents. Part 2. Synthesis of Alkylphenol Derivatives Linked with Sulfur and Their Antimicrobial Activity", J. Antibact. Antifung. Agents vol. 13, No. 5, pp. 205–209 (1985).

Y. Inouye, et al., Studies on the Wood Preservatives. I. The Sterilizing Power of O–Cresol Sulfur Resin against Wood Destroying Fungi, Wood Research, Bulletin of the Wood Research Institute; Kyoto University, No. 4, Feb. 1950, pp. 19–23 with english translation.

Chemical Abstracts, vol. 106, 155968 (1986).

D.A. Webb, et al., "A Component of Creosote—Sulfur—to Increase Wood Preservative Performance", American Wood–Preservers' Association, pp. 152–156 (1981).

*Primary Examiner*—Vivian Chen
(74) *Attorney, Agent, or Firm*—Richard P. Fennelly

(57) ABSTRACT

An article comprising wood can be preserved by applying to the wood an effective amount for the preservation of the wood of a polymeric phenol sulfide having a tri- or higher sulfide bridge therein, which can be a polymeric alkyl phenol sulfide, such as one containing an alkyl group containing from one to about four carbon atoms in the alkyl group contained therein of the following formula, where R is the alkyl group,:

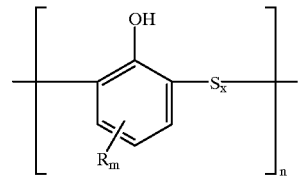

where R is alkyl, m is from 1 to 3, n ranges from about 2 to about 10, and x is 3 or higher.

10 Claims, No Drawings

WOOD PRESERVATION UTILIZING POLYMERIC PHENOL SULFIDE

This application is a continuation of Ser. No. 08/763,655, filed Dec. 11, 1996, U.S. Pat. No. 5,925,424.

BACKGROUND OF THE INVENTION

The use of tropical hardwood, which needs no or very little artificial preservation, in agricultural, hydrological and building applications throughout the world is expected to be prohibited because the availability of hardwoods from non-durable resources, namely, from demolishing wild forest, will be severely curtailed. The problem, therefore, for the future is to develop environmentally compatible preservatives for softwoods from northern regions like Canada, Scandinavia and Siberia so that they can compete with hardwoods in commercial applications. In the United States alone, the wood preserving industry used over one hundred and seventy million pounds of preservative chemicals to pressure treat four hundred and eighty-four million cubic feet of wood in 1990. The future of the three most widely used preservatives, namely, chromated copper arsenate (CCA), pentachloro phenol (PCP) and creosote (which is a mixture of phenolic compounds) is very bleak because of their toxicity and propensity to leaching from incorporated wood. These compounds, therefore, are receiving regulatory pressure from the government environmental protection agencies and face elimination as soon as viable alternatives are found.

In addition to phenolic compounds, sulfur compounds are extensively used in agricultural field as herbicides and insecticides. Therefore, it is an objective of this invention to prepare wood preservative compounds containing both phenol and sulfur moieties in the compounds. These compounds should be in oligomeric or polymeric form so that they would have a reduced tendency to leach out from incorporated woods. Examples of the use of monomeric phenol/sulfur compounds as antioxidants in the plastics and food applications can be found in the literature. Derwent Patent Abstract 86-292906/45 (1986) describes the use of mercaptophenols (obtained by reducing polythiobisphenols) as antioxidants for rubbers and plastics; Derwent Patent Abstract 90-62763/09 (1990) describes an antibacterial composition for paints and wooden articles comprising bithionol or fenticlor and trihalogenated phenol; Derwent Patent Abstract 90-87253/12 (1990) describes a delayed release antibacterial composition comprising an inclusion compound of hinokitiol with a bisphenol; and Derwent Patent Abstract 91-248660/34 (1990) describes a bactericidal and fungicidal composition prepared from a mixture of chlorhexidine trihalogenated phenols and phenylphenols. In addition, K. Asakura et al., Journal of the American Oil Chemist's Society, Vol. 66, No. 10, Oct. 1989, pp. 1450–1453 report the antioxidant effect and antimicrobial activity of phenolic sulfides wherein the sulfur is attached to the alkyl side chain. These phenolic sulfides were prepared by Michael addition and radical addition reactions of ethanethiol and ethanedithiol with o-, m- and p-vinylphenol. U.S. Pat. No. 3,812,192 to R. Gabler et al. reports that certain bisphenol compounds linked together with a thio bridge are highly active fungicides having a broad spectrum of activity.

A recent disclosure that oligomeric phenol sulfide compositions exhibit antimicrobial activity is found in K. Kawada et al., J. Antibact. Antifung. Agents, Vol. 13, No. 5, pp. 205–209 where it was reported that the tested monosulfide dimers and monosulfide oligomers were found to be less active against certain bacteria and fungi than the startingf alkylphenols.

SUMMARY OF THE INVENTION

The present invention, in one embodiment, relates to an article comprising wood and an effective amount for the preservation of the wood of a polymeric phenol sulfide, which can be a polymeric alkyl phenol sulfide, such as one containing an alkyl group containing from one to about four carbon atoms in the alkyl group contained therein. The invention also relates to a method of preserving an article which comprises wood which comprises applying to the article an effective amount for preservation of the wood of a polymeric phenol sulfide, such as one containing an alkyl group containing from one to about four carbon atoms in the alkyl group contained therein.

DESCRIPTION OF THE PREFERRED EMBODIMENTS

The polymeric phenol sulfides, optionally where the phenol group therein is substituted with at least one alkyl group, are a known class of chemical compound which have been widely used, for example, as a rubber vulcanizing agent. This class of composition can be represented by the following formula:

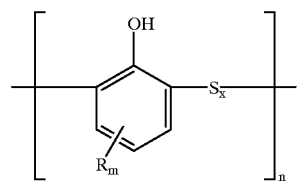

where R is alkyl, such as lower alkyl containing from one to four carbon atoms in the alkyl group, m is from 1 to 3, preferably 1 or 2, and n, the repeat unit for the depicted structure, can range from about 2 to about 10. The value of the repeat unit n will depend upon the ratio of the reactants used. The value for x, the number of sulfur atoms in the bridge between phenol groups, can range from 1 to about 4. The sulfur ranking depends on the value for x and will be larger if the amount of sulfur introduced into the reaction is larger. If sulfur dichloride is used in accordance with the reaction in Example 1, which follows, x will be about 1 if no additional sulfur is used. If sulfur monochloride is employed, x would be about 2. If a tri- or higher sulfide product is desired, elemental sulfur can be added in addition to the previously described sulfur monochloride or dichloride reagents for reaction with the phenol or alkyl phenol reagent. Further information on how to make such alkyl phenol sulfides can be found in U.S. Pat. No. 2,422,156 which is incorporated herein by reference.

The foregoing type of active ingredient for wood preservation can be incorporated in an effective amount (e.g., from about 1% to about 20%, by weight) in a suitable liquid vehicle along with other desired functional additives for use in the treatment of wood. Included as suitable liquid vehicles are xylene, N-methylpyrrolidinone, and methylene chloride. Examples of the types of functional additives that can be used include supplementary wood preservation chemical(s), surfactant(s), colorant(s), ultraviolet light retardant(s).

The Following Examples further illustrate certain embodiments of the present invention.

EXAMPLE 1

This Example illustrates the synthesis of the polymeric xylenol tetrasulfide composition which is used as a wood preservative in accordance with the present invention.

The preparative procedure for making the polymeric xylenol tetrasulfide "PXTS") is as follows:

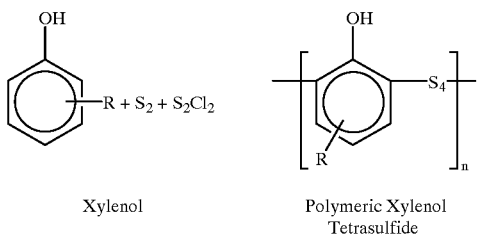

Xylenol          Polymeric Xylenol Tetrasulfide

The following reactants were used:

| | |
|---|---|
| Xylenol* | 226 gm. |
| Sulfur | 128 gm. |
| $S_2Cl_2$ (Sulfur Monochloride) | 270 gm. |
| $CH_2Cl_2$ (Methylene Chloride) | 300 ml. |

*cresylic acid from Merichem Chemicals.

The following preparative procedure was employed:

In a resin kettle fitted with a mechanical stirrer, thermometer, water condenser, dropping funnel, and heating mantle was placed the xylenol, sulfur and $CH_2Cl_2$ reagents. While stirring vigorously, $S_2Cl_2$ was added dropwise from the dropping funnel over a period of two hours during which time HCl gas was rapidly evolved. The reaction temperature stayed below 50° C. In order to complete the reaction, the reaction was carried out for an additional six hours at 60° C. The reaction product was an essentially odorless yellow solid having a melting point of about 65° C.

EXAMPLE 2

This Example illustrates the incorporation of the polymeric xylenol tetrasulfide product from Example 1 into southern pine sapwood.

The incorporation of the PXTS into sapwood cubical blocks involves the following steps:

(1) The wood blocks were dried in a vacuum oven for forty-eight hours at 65° C. followed by cooling in a desiccator before recording the weights of the wood blocks.

(2) A 10% solution of PXTS was prepared by heating 15 g of PXTS in 135 ml of xylene at 70° C. for two hours.

(3) A resin kettle fitted with a dropping funnel containing the 10% PXTS solution was connected to a vacuum pump with a surge tank in between the resin kettle and the pump. The dried and weighted wood blocks were then placed inside the resin kettle which, along with the surge tank, was then evacuated to approximately 2.5 mm of mercury for twenty-four hours.

(4) The pump was then shut-off and then the valve of the funnel was opened to let the PXTS solution flow under pressure of atmosphere into the evacuated resin kettle containing the wood blocks until all the wood blocks were completely covered by the solution. Then, keeping the wood blocks completely submerged in the solution, air was let into the surge tank.

(5) The wood blocks were soaked under the above conditions for twenty-four hours. The blocks were then wiped dry with paper towels to record the wet weight gain experienced by the samples which ranged from about 97.5 to about 122%. Finally, the actual amount of polymer PXTS in the wood blocks (which ranged from about 10.5% to about 11%, by weight) was determined by drying the wet wood blocks in a vacuum oven at 60° C. for approximately eighteen hours to remove solvent xylene.

EXAMPLE 3

This Example reports the results of tests to illustrate the permanency of the polymeric xylenol tetrasulfide (PXTS) wood preservative candidate in the wood.

In order to demonstrate the permanency, i.e., non-leachability, of the PXTS from incorporated wood blocks containing 10.5–11%, by weight, PXTS, conditioned, untreated wood blocks and PXTS-containing wood blocks were submerged in distilled water with constant stirring at room temperature for various time intervals. The conditioning procedure comprised first placing the dry untreated and treated wood blocks in a vacuum oven at 65° C. for eighteen hours followed by removal of the wood blocks from the oven with their placement immediately in a desiccator to cool for about two hours. The dry weight of the samples was recorded.

At predetermined time intervals, the wood blocks were taken out of water followed by conditioning to record the weights of the wood blocks in order to determine preservative loss from the incorporated wood blocks and to compare these losses to those from the untreated wood samples. Similarly, a small portion of water samples were also taken out for analysis. After twenty-five days of extraction, the untreated wood blocks experienced a loss of about 0.9% and the PXTS-containing wood blocks suffered a loss of about 1.2%. These results clearly demonstrate the non-leachability of PXTS into water. There was also no difference in the UV spectra of the water samples obtained from treated and untreated wood blocks.

EXAMPLES 4–7

These Examples show the biological evaluation data for wood blocks incorporated with a polymeric xylenol tetrasulfide wood preservative composition in a mini block test.

Twelve blocks (19×8×8 mm) of Ponderosa pine (*Pinas ponderosa*) sapwood were placed in a vacuum oven at 65° C. for fifteen hours to eliminate all the moisture. The wood used in this Example meet all criteria used in the standard method for testing wood preservatives by laboratory soil-block cultures (AWPA E10-91). Eight blocks were retained as control samples in the mini block evaluation test. Four blocks were treated with a poly(xylenoltetrasulfide) as described above. After treatment, the blocks were redried in a vacuum oven at 65° C. for fifteen hours. All blocks were weighed and then place in a plastic bag in a desiccator until placed into the mini block biological evaluation. Cultures of two brown rot fungi were maintained on 4% malt agar. The two fungi were *Coniophora puteana* (ATCC 36336) and *Gloephyllum trabeum* (ATCC 11539) obtain for ATCC. Both of these organisms are used as standard test organisms for evaluation of wood preservatives (Anonymous, 1991, Standard Method for Testing Wood Preservatives by Laboratory Soil-Block Cultures, American Wood Preserver's Association Standards, E10-91). These fungi were incubated for ten days at 25° C. to obtain active growing mycelium. A plastic mat with a diameter of 7 mm was sterilized in alcohol and was placed on top of the growing cultures in a sterile flowbench. Using sterile tweezers, three blocks were placed in each plate, with one treated block and two control blocks. The culture plates were resealed with paraflim and placed in a incubator at 25° C. for six weeks.

After incubation, the blocks were removed and surface mycelium was removed using a soft brush. The blocks were weighed and placed in a vacuum oven at 65° C. until a constant dry weight was obtained. The weigh loss data for the blocks are shown below:

| Organism | Average weight loss (%) | |
|---|---|---|
| | Untreated blocks Control | Treated blocks Poly (xylenoltetrasulfide) |
| *G. trabeum* | 21.01% ± 1% | 3.21% ± 1% |
| *C. puteana* | 34.36% ± 3% | 2.01% ± 0.9% |

The test results indicate that treatment with PXTS, in accordance with the invention, demonstrated wood preservation utility with the weight loss of the treated blocks being significantly lower than the weight loss of the untreated blocks in the same plates. The average retention for blocks treated with poly(xylenol tetrasufide) was 10.8 kg/m$^3$. The weight loss values for untreated blocks indicate that the fungi in the plates had a high decay potential and agree with literature values for *C. puteana* (D. Blow, 1986, Alkyl Dimethyl Benzyl Ammonium Chloride: Toxicity to *C. puteana* When Formulated in Water and Organic Solvent, IRG/WP/2250). Therefore, the treatment appears sufficient in controlling decay caused by the two brown rot fungi tested.

The foregoing Examples should not be construed in a limiting sense since they are intended to only depict certain embodiments of the present invention. The Claims which follow set forth the desired scope of protection.

We claim:

1. In combination, an article comprising wood and an effective amount for the preservation of the wood of a polymeric phenol sulfide which is formed by the reaction of (1) a phenol or alkyl phenol reagent, (2) sulfur monochloride or sulfur dichloride, and (3) excess elemental sulfur.

2. A combination as claimed in claim 1 wherein the polymeric phenol sulfide is a polymeric alkyl phenol sulfide.

3. A combination as claimed in claim 2 wherein the alkyl group, R, contains from one to about four carbon atoms therein.

4. A combination as claimed in claim 1 wherein the polymeric alkyl phenol sulfide of the formula

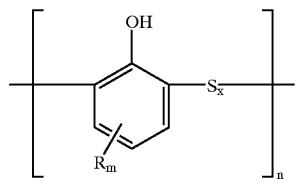

where R is alkyl, m is 0 when phenol is used as the reagent and is from 1 to 3 when an alkyl phenol is used as the reagent, n ranges from about 2 to about 10, and $S_x$, is trisulfide or higher.

5. A combination as claimed in claim 4 wherein the alkyl group, R, contains from one to about four carbon atoms therein and $S_x$ is trisulfide or higher.

6. A method of preserving an article which comprises wood which comprises applying to the article an effective amount for preservation of the wood of a polymeric phenol sulfide which is formed by the reaction of (1) a phenol or alkyl phenol reagent, (2) sulfur monochloride or sulfur dichloride, and (3) excess elemental sulfur.

7. A method as claimed in claim 6 wherein the polymeric phenol sulfide is a polymeric alkyl phenol sulfide.

8. A method as claimed in claim 7 wherein the alkyl group, R, contains from one to about four carbon atoms therein.

9. A method as claimed in claim 6 wherein the polymeric alkyl phenol sulfide of the formula

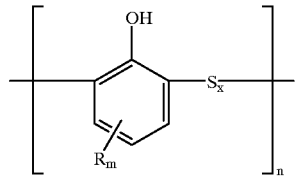

where R is alkyl, m is 0 when phenol is used as the reagent and is from 1 to 3 when an alkyl phenol is used as the reagent, n ranges from about 2 to about 10, and $S_x$ is trisulfide or higher.

10. A method as claimed in claim 9 wherein the alkyl group, R, contains from one to about four carbon atoms therein and $S_x$ is trisulfide or higher.

* * * * *